United States Patent Office 3,330,286
Patented July 11, 1967

3,330,286
TOBACCO SMOKE FILTERS AND ADDITIVES THEREFOR
Charles Clayton White and James Sheffield Crowell, Kingsport, Tenn., assignors to Eastman Kodak Company, Rochester, N.Y., a corporation of New Jersey
No Drawing. Filed Jan. 3, 1964, Ser. No. 335,669
4 Claims. (Cl. 131—267)

This invention relates to additives for tobacco smoke filter tow. More particularly, the invention is concerned with a tow treating composition and filter elements prepared from tow having said composition applied thereto.

U.S. Patents 2,881,770 and 3,043,736 to our coworker Touey concern use of bonding media or agents for applying activated carbon to filter tow. The bonding media or agents disclosed by Touey include organic plasticizers capable of supporting said bonding by partially dissolving or solvating the filaments of the tow. More recently there has been suggested in the art, the use of certain special vinyl pyrrolidone polymer bonding agents. While such recently suggested agents are useful as bonding media for applying activated carbon to filter tow, their limited availability on the market and fluctuations in sale prices has created a demand for bonding agents which are as efficient and yet more readily available and more economical to use.

Accordingly, development of a tow treating composition utilizing a low cost and easily obtainable bonding agent for use in applying said composition to filter tow represents a highly desirable result. After extended investigation, we have found such a composition which is not only economical to use but one which when applied to tow used in tobacco smoke filters also provides efficient removal from tobacco smoke of certain gas-phase components sometimes disagreeable to the smoker. Also, filter rods made from tow treated with our composition exhibit excellent firmness and substantially no dusting of carbon during rod manufacture.

One object of our invention is to provide a composition adapted for convenient and easy application to filter tow. Another object is to provide a tobacco smoke filter element made from tow containing as additive a composition which enhances the filterability and rigidity of said filter element. A further object is to provide a tow-treating composition of sufficiently low viscosity to permit substantially uniform application to filter tow. A still further object of this invention is to provide a method for enhancing the bonding of carbon additives to tobacco smoke filter tow. Further objects will appear hereinafter.

In its broader aspects our invention involves a homogeneous-mixture suspension comprising at least about 25% activated carbon, about 1-3% methyl cellulose, about 4-6% polyvinyl alcohol and the remainer water, the percent being by weight. This suspension is especially adapted for application to filter tow in an amount such that the tow contains from about 55 to 65% by weight activated carbon, about 8 to 12% polyvinyl alcohol and about 3 to 5% methyl cellulose, these percentages being based upon the weight of the untreated tow. The amount of carbon which may be added to filter tow by use of this composition is from about 30 to 60% by weight. The ratio of carbon to total of polyvinyl alcohol and methyl cellulose is at an optimum at about 5 to 1.

The tow treating composition of our invention may be applied by first dissolving the polyvinyl alcohol and methyl cellulose in the water and then adding the activated carbon by stirring the resulting suspension until a homogeneous mixture is obtained. This mixture is then applied to the opened or spreadout tow by brushing, spraying, immersion of tow therein, roll application or the like or by any of the methods disclosed by our coworker Touey in U.S. Patent 3,043,736. The methyl cellulose and polyvinyl alcohol act as agents for binding the activated carbon to the tow in a highly uniform distribution.

While we do not wish to be limited to any particular theory as to why our composition is efficient both insofar as application ot the tow and increasing the filterability of tobacco smoke filter rods prepared from tow on which it is used, it appears that the methyl cellulose and the polyvinyl alcohol somehow work together to eliminate some of the problems sometimes encountered by the use of either one individually. Thus, by use of the specific combination of polyvinyl alcohol and methyl cellulose, dusting off of carbon during application to the tow is substantially eliminated and tow matting such as sometimes encountered by the use of polyvinyl alcohol alone substantially reduced. Apparently both the methyl cellulose and polyvinyl alcohol also contribute to the efficiency of the activated carbon in aiding removal of undesirable gas-phase components of the tobacco smoke. In addition, the use of polyvinyl alcohol in conjunction with methyl cellulose eliminates the need of a further dispersing or wetting agent such as a surfactant. However, a small amount of a wetting agent may be included, if desired. The rigidity or firmness of filter elements prepared from tow to which a carbon/water/methyl cellulose/polyvinyl alcohol suspension has been applied is also enhanced. A further advantage of the use of such composition is the provision of adequate binding characteristics for the carbon being applied while at the same time permitting a liquid medium of sufficiently low viscosity for easy application. Also, the polyvinyl alcohol and methyl cellulose binder constituents are readily and economically available and surprisingly are highly effective when used in the minor amounts called for by our invention.

The activated carbon used according to our invention may be derived from coconut shell, wood, petroleum, coke, bone, or other sources. It should be of finely divided 150–325 mesh size.

According to preferred embodiment of this invention about 62% of the weight of the untreated filter tow is comprised of activated carbon, with the binding agents comprising about 4% for methyl cellulose and about 10% for polyvinyl alcohol.

For a further understanding of our invention the following examples are presented as illustartive.

*Example I*

A continuous filament 8 denier per filament (d./f.), 48,000 total denier (t.d.), cellulose acetate tow of 9 crimps per inch was opened and banded to a width of 8 inches. While the tow was spread out in this open condition, it was treated with a liquid medium which had the following composition in percent by weight.

| | Percent |
|---|---|
| Activated carbon (Barnebey-Cheney, Type 495, 325 coconut shell) | 26.0 |
| Methyl cellulose ("Methocel," MC, USP, 15 cps. viscosity) | 2.0 |
| Polyvinyl alcohol ("Elvanol," 51–05 88% hydrolyzed) | 5.0 |
| Water | 67.0 |

This composition had a viscosity of 2,000 cps. as determined by the Brookfield viscometer. It was applied by pressure rolls. The tow was dried and fed into a garniture through a shaping horn which served to convert the treated tow into the form of a rod. The filaments were wrapped with paper and cut into lengths similar in size to cigarettes. Use of the above composition resulted in satisfactory performance throughout the manufacture of the filter rod with application of 57.0% carbon, 10.7% polyvinyl alcohol, and 4.4% methyl cellulose based on the weight of the cellulose acetate tow. The filter rods were very firm and showed very little dusting of the carbon. This sample was given a rating of 4 for dusting characteristics, which is considered satisfactory. Similar compositions containing equal amounts of polyvinyl alcohol alone showed ratings of 12, and a similar composition containing an equivalent amount of methyl cellulose had a rating of 7. The lower the rating, the less was the dusting. Thus, neither the methyl cellulose nor the polyvinyl alcohol when used alone were as satisfactory from the standpoint of dusting characteristics as the blend of the two.

The filter rods were then cut into 10 millimeter lengths and fitted to a standard brand of cigarettes. The cigarettes were machine-smoked and tested by gas chromatography for removal of acetaldehyde, isoprene and acetone. The following table presents results of a smoking test in which removal efficiency of the rods of these cigarettes was compared with filter tips of the same size made from the same tow of cellulose acetate fibers on which 3.7% methyl cellulose based on the weight of the tow was used as binder.

|  | Percent Removal | | |
| --- | --- | --- | --- |
|  | Acetaldehyde | Isoprene | Acetone |
| Filter Tip Treated with Composition of this Example (I) | 28 | 63 | 62 |
| Filter Tip Treated with Methyl Cellulose Binder without Polyvinyl Alcohol | 19 | 41 | 47 |

The cigarettes fitted with the acetate tow filters treated with the polyvinyl alcohol/methyl cellulose/carbon suspension had substantially the same average pressure drop as those which were treated with methyl cellulose/carbon.

*Example II*

The following composition was applied to spread-out crimped continuous filament cellulose acetate filter tow.

| Composition | Percent by weight |
| --- | --- |
| Activated carbon | 25.8 |
| Methyl cellulose | 2.0 |
| Polyvinyl alcohol | 1.0 |
| Water | 71.2 |

Firm filter rods were prepared from this tow with very little dusting of carbon.

From the preceding description and examples it should be evident that we have provided an economical and easily applied liquid treating composition adapted for application to filter tow used in the production of filter rods of combined high removal efficiency and firmness or rigidity.

While the above binder composition is preferred for activated carbon alone, it is possible to employ the binder with other similar particulate additives such as starch particles. Such additives are described in other of the Touey et al. patents already published, e.g., U.S. Patent Nos. 2,940,456; 2,956,329; 3,033,212; 3,008,474; 3,008,473; 3,021,242; 3,008,472; 3,026,226; 3,003,504 and 2,881,772. The additives described in these patents include, among others, polyamine salts, calcium salts, magnesium salts, silica gel, sorbital glycoside, methyl glycoside, and cellulose that has an acetyl radical in its composition.

The invention has been described in detail with particular reference to preferred embodiments thereof, but it will be understood that variations and modifications can be effected within the spirit and scope of the invention as described hereinabove and as defined in the appended claims.

We claim:

1. Tobacco smoke filter made from a tow, said tow carrying thereon a composition comprising at the time of application about 26% by weight activated carbon, about 2% by weight methyl cellulose, about 5% by weight polyvinyl alcohol, and about 67% by weight water, said tow containing deposited thereon by said composition about 60% by weight of said tow activated carbon, about 4% by weight of said tow methyl cellulose and about 10% by weight of said tow polyvinyl alcohol, said methyl cellulose and polyvinyl alcohol composition functioning to bond the activated carbon to the tow.

2. The tobacco smoke filter of claim 1 wherein the tow comprises crimped continuous filament cellulose acetate.

3. A tobacco smoke filter element comprising crimped continuous filament cellulose acetate tow compacted in rod-like form and carrying thereon about 50–70% of at least one particulate additive selected from the group consisting of activated carbon, starch, polyamine salts, calcium salts, magnesium salts, silica gel, sorbital glycoside, methyl glycoside, and cellulose that has an acetyl radical in its composition, said particulate additive serving to enhance the filterability of the filter element, about 5–15% polyvinyl alcohol, and about 1–5% methyl cellulose, said percent being based on the weight of said tow, said methyl cellulose and polyvinyl alcohol composition functioning to bond the particulate additive to the tow.

4. A tobacco smoke filter element comprising crimped continuous filament cellulose acetate tow compacted in rod-like form having deposited thereon 45–75% of at least one solid particulate additive, about 1–25% polyvinyl alcohol, about 1–10% methyl cellulose, said percent being based upon the weight of said tow, said methyl cellulose and polyvinyl alcohol composition functioning to bond the particulate additive to the tow.

References Cited

UNITED STATES PATENTS

| 3,030,258 | 4/1962 | Wagner et al. | 156—71 |
| 3,032,445 | 5/1962 | Hamon | 131—10.9 |
| 3,101,723 | 8/1963 | Seligman et al. | 131—266 |

SAMUEL KOREN, *Primary Examiner.*

MELVIN D. REIN, *Examiner.*